Jan. 7, 1941.    L. C. SWALLEN ET AL    2,227,605
APPARATUS FOR EXTRACTION
Filed Sept. 19, 1938
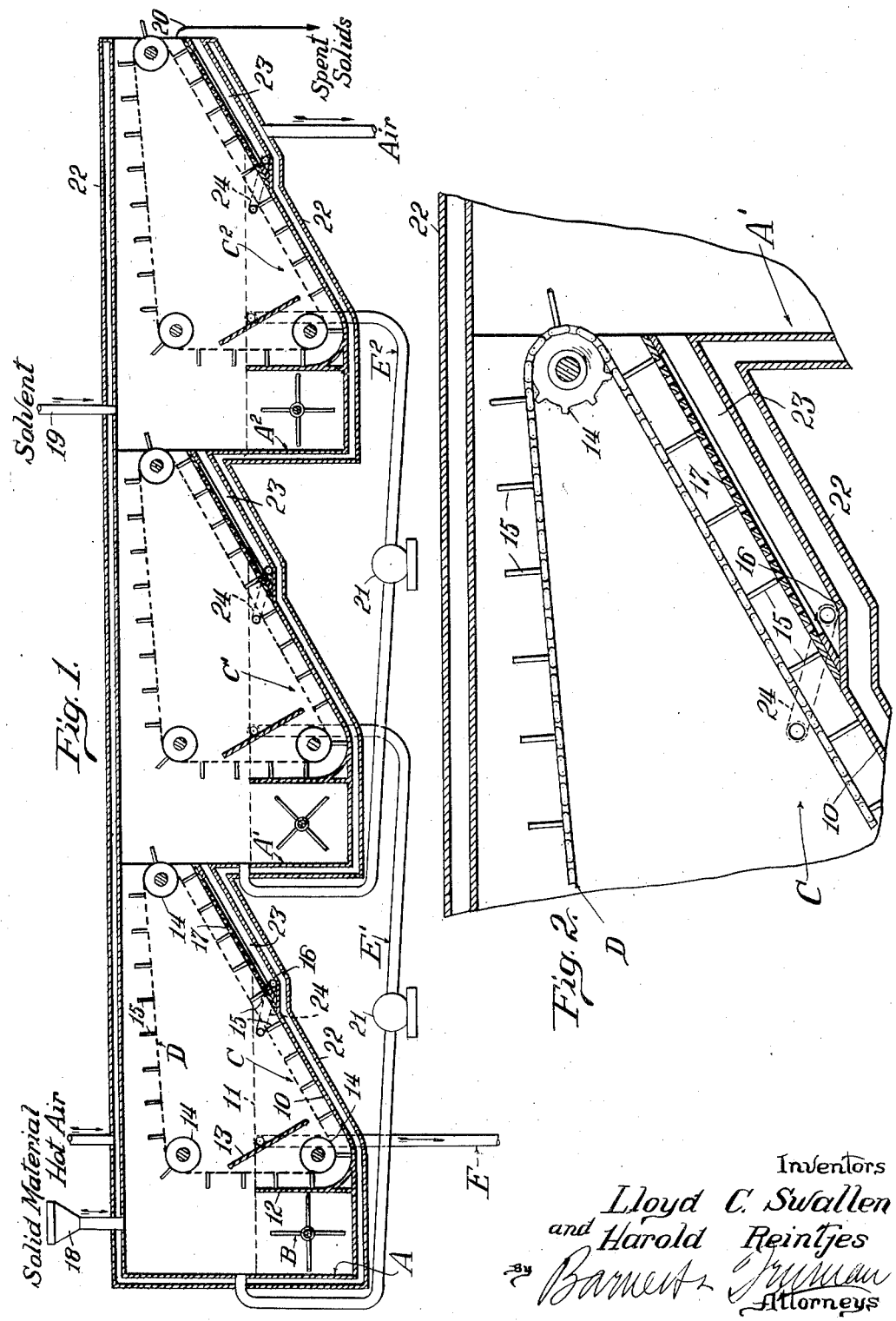
Inventors
Lloyd C. Swallen
and Harold Reintjes
By Barnett & Truman
Attorneys Patented Jan. 7, 1941

2,227,605

UNITED STATES PATENT OFFICE 2,227,605

APPARATUS FOR EXTRACTION

Lloyd C. Swallen and Harold Reintjes, Pekin, Ill., assignors to Corn Products Refining Company, New York, N. Y., a corporation of New Jersey Application September 19, 1938, Serial No. 230,727

4 Claims. (Cl. 23—270)

This invention relates to extraction of soluble substances from solid material by means of suitable solvents.

One of the objects of the invention is to provide a novel and improved apparatus for extracting zein (the alcohol soluble constituent of corn protein) from gluten meal, whereby the zein may be very completely extracted from the meal and an extract obtained containing a minimum amount of denatured protein. Many processes and apparatuses have been devised for extracting soluble substances from solid materials and separating the solvents and extractives from the spent solid materials. Generally speaking, these processes and apparatuses have not been found suitable for the extraction of zein from corn (maize) gluten meal. The mixture of gluten meal and alcoholic solvent has the property of settling fairly readily, but still not as readily as is required by certain commonly used extraction processes. The viscosity of the extract, imparted to it by the dissolved zein, also interferes with the proper settling of the gluten meal necessary in order to obtain a fairly clear extract. Furthermore the gluten meal tends to settle in a rather firm mass through which an agitator can be moved only with difficulty. Also the fine meal tends to clog the spaces between the larger meal particles which causes difficulties where certain known percolation methods of extraction are employed. Another difficulty in the use of the common extraction or percolation processes is that the large amount of zein extracted at the start tends to form with the meal a viscous mass which the solvent penetrates only with difficulty. The present invention overcomes these difficulties in the manner to be hereinafter described and provides a highly satisfactory method of extraction of zein from gluten meal.

While the invention is concerned particularly with the extraction of zein, the apparatus as herein disclosed will be found suitable for other extraction processes in which the extract drains fairly readily from the solids. For example, it may be used for the extraction of oil from corn (maize) germs or from cotton seeds or soy beans.

According to the present invention the material treated, gluten meal, for example, is first thoroughly mixed with the solvent, preferably isopropyl alcohol, in the case of zein extraction, and this mixture is allowed to overflow into a settling vessel which has a sloping bottom extending for a considerable distance above the normal liquid level in the vessel. The solids which subside in the settling vessel are dragged upwardly along the sloping bottom of the vessel, the apparatus being constructed to permit the liquid to drain back into the vessel. The solvent and extractives are withdrawn from the settling vessel at or near the liquid level in the vessel.

Preferably the apparatus consists of a series of units through which the solid material is passed in one direction while the solvent and extractives are moved in the other direction on the counter-current principle.

The invention is illustrated in the accompanying drawing wherein:

Fig. 1 illustrates a preferred form of apparatus for practising the process consisting of three units arranged on the counter-current principle; the drawing being a longitudinal sectional view somewhat diagrammatic in character.

Fig. 2 is a longitudinal sectional view, on an enlarged scale, illustrating a part of one of the units.

Referring to the drawing, A designates a mixing vessel provided with a rotating agitator B. C designates a settling vessel provided with a sloping bottom 10 extending above the normal liquid level in the vessels A and C indicated by the broken line 11. The vessels A and C have a common wall 12 forming a weir over which the mixture of solids and solvent made into a flowable mixture by the agitator B overflows from vessel A into vessel C. Preferably a baffle plate 13 is arranged in the settling vessel C in front of the weir 12. Means are provided in the settling vessel for moving the settled solids upwardly along the inclined bottom wall 10 of the vessel and discharging the same into the adjacent mixing vessel indicated fragmentarily at A'. Preferably, this apparatus consists of an endless drag-belt D extending over pulleys 14 and provided with paddles 15. The upper portion of the inclined bottom 10 is preferably offset at 16 to provide a drain duct 23 and above this offset portion of the bottom, in line with the lower part of the inclined bottom, is a screen 17, or other foraminous drain element through which liquids contained in the solids may pass and be drained through duct 23 back into the body of liquid in the settling vessel by pipe 24.

The solvent and extractives are discharged from the settling vessel through pipe E preferably arranged on the other side of baffle 13 from the mixing vessel A.

The single unit above described may be used by itself, but preferably, for the sake of efficiency and economy, the extraction apparatus will consist of a plurality of such units arranged on the counter-current principle as shown in Fig. 1 where there is disclosed a battery consisting of three units. The solid material enters the mixing vessel A through the feed hopper 18. The solvent enters the mixing vessel A² through pipe 19. Solvent and extractives pass from the settling vessel C² through pipe E² to the mixing vessel A'. Similarly solvent and extractives pass from the settling vessel C' through pipe E' to the mixing vessel A. The gluten meal from the settling vessel C is discharged into the mixing vessel A'; and the gluten meal from the settling vessel C' is discharged into the mixing vessel A². The spent solids are discharged from the settling vessel C² at 20. Pipes E' and E² are shown as provided with pumps 21, 21.

Preferably the extraction apparatus is provided with a jacket 22 for the circulation of hot air or hot water.

In the extraction of zein it is desirable to keep the material at temperatures between about 120° and 160° F.

It is the intention to cover by patent all equivalents and also all modifications within the scope of the appended claims.

We claim:

1. Extraction apparatus comprising: a mixing vessel; means for introducing material for extraction and solvent into the mixing vessel an agitator in the mixing vessel for making a flowable mixture of said material and solvent; a settling vessel provided with an upwardly inclined bottom wall the upper portion of which is provided with a foraminous drainage element and with means constituting a drainage channel; a weir between the mixing vessel and the settling vessel over which the mixture in the mixing vessel flows into the settling vessel; a baffle plate arranged in the settling vessel in front of said weir, an endless drag chain for moving the solids upwardly along said inclined bottom; and a discharge pipe for the solvent and extractives leading from the settling vessel arranged on the other side of the baffle plate from said mixing vessel.

2. Apparatus in accordance with claim 1 consisting of a plurality of connected extraction units through which the solids are moved in one direction and the solvent and extractives in the other direction.

3. In extraction apparatus the combination of a mixing vessel; means for introducing solid material and a solvent into said mixing vessel; agitating means in said mixing vessel for making a flowable mixture of said solid material and solvent; a settling vessel; a pipe leading from the settling vessel for discharge of solvent and extractives a weir between the mixing vessel and the settling vessel over which said flowable mixture is caused to flow from the mixing vessel to the settling vessel; said settling vessel having a sloping bottom; and a drag belt for dragging settled solid material up said sloping bottom and discharging the same from the settling vessel.

4. In extraction apparatus the combination of a series of extraction units each consisting of a mixing vessel, a settling vessel provided with a sloping bottom, and a weir between the mixing vessel and the settling vessel; means for introducing solid material into the mixing vessel at one end of the apparatus; means for introducing solvent into the mixing vessel at the other end of the apparatus; agitating means in each of said mixing vessels for making flowable mixtures of said solid material and solvent which mixtures flow over the weirs into the adjacent settling vessels, respectively; drag belts for dragging the settled material up the sloping bottoms of said settling vessels, the drag belts of each unit, except the unit into which the solvent is introduced, discharging material into the adjacent mixing vessels, respectively, and the drag belt in the unit into which the solvent is introduced discharging material from said apparatus; means for transferring the extract from the settling vessel of each unit except the unit most remote from that into which the solvent is introduced to the mixing vessels of the adjacent unit; and means for discharging the extract from the mixing vessel of the unit most remote from the unit into which the solvent is introduced.

LLOYD C. SWALLEN.
HAROLD REINTJES.